(12) United States Patent
Zulkowski

(10) Patent No.: US 7,844,060 B2
(45) Date of Patent: Nov. 30, 2010

(54) REMOTE CONTROL SINGLE CRYSTAL SPEAKER SYSTEM

(76) Inventor: Terry Zulkowski, 5611 Kunz Rd, Needville, TX (US) 77461

( * ) Notice: Subject to any disclaimer, the term of this patent is extended or adjusted under 35 U.S.C. 154(b) by 1028 days.

(21) Appl. No.: 11/485,246

(22) Filed: Jul. 12, 2006

(65) Prior Publication Data

US 2007/0110266 A1    May 17, 2007

Related U.S. Application Data

(60) Provisional application No. 60/656,144, filed on Jul. 12, 2005.

(51) Int. Cl.
*H04R 1/02* (2006.01)
*H04R 25/00* (2006.01)
(52) U.S. Cl. .......................... 381/87; 381/152
(58) Field of Classification Search .................. 381/87, 381/88, 90, 152, 182, 186, 188, 189, 205; 181/150, 199

See application file for complete search history.

(56) References Cited

U.S. PATENT DOCUMENTS 5,980,057 A * 11/1999 Christie ...................... 362/86
2005/0078837 A1* 4/2005 Hornback .................... 381/87

* cited by examiner

*Primary Examiner*—Brian Ensey
(74) *Attorney, Agent, or Firm*—Raymond R. Ferrera; Adams and Reese LLP

(57) ABSTRACT

A light socket mounted radio receiver speaker device having a light bulb screw base for attaching to a light socket. A detector having a detector signal input, a first electrical output and a control output is electrically connected to the light bulb screw base. A radio receiver is controlled by the control output of the detector, having a radio frequency input and an audio signal output, whereby said radio receiver converts a radio signal into an audio signal. A speaker is connected to the audio signal output of the radio receiver, whereby said audio signal may be propagated. A light bulb socket is in electrical connection with the first electrical output of the detector.

16 Claims, 2 Drawing Sheets

REMOTE CONTROL SINGLE CRYSTAL SPEAKER SYSTEM

STATEMENT OF RELATED CASES

This application claims the benefit of U.S. Provisional Application No. 60/656,144, filed Jul. 12, 2005.

FIELD OF THE INVENTION

The present invention relates generally to speakers for sound systems, and in a particular, non-limiting embodiment, to a system in which a speaker is disposed in the screw terminal of a light bulb receiving member. In a presently preferred embodiment of the invention, the speaker comprises a single crystal type tuner that is both heat resistant and otherwise durable to ambient elements.

BACKGROUND OF THE INVENTION

Wireless intercoms, wireless headphones, and similar devices are well known in the art. These devices share a common limitation in that their footprint is typically transitory and cluttered with wiring. For example, a wireless intercom typically has a portable housing unit that takes up space on a nightstand or dresser. To keep the wireless intercom powered, a wire must go from the housing unit to a charging pack, typically plugged into a distant electrical wall outlet. An attempt to more permanently mount the unit in a room still results in running wiring for power and expensive and inconvenient attachment to a wall or other structure. It is typically not possible to provide a speaker mounting that is concurrently: semi-permanently mounted, substantially fixed in a location and position, easily deployed and removed, and dispenses with the need for wiring for power and audio signal.

SUMMARY OF THE INVENTION

The present invention relates to a system in which a speaker is disposed in the screw terminal of a light bulb receiving member. In a presently preferred example of the invention, the speaker comprises a single crystal type tuner that is both heat resistant and otherwise durable to ambient elements. The system also comprises a receiving member appropriate for receiving a radio frequency type input signal from a master transmission system, and a local transmitter for transmitting a localized output signal for the benefit of people located in the vicinity of the speaker.

In various other embodiments, the system instead includes a more sophisticated tuner, such as an integrated miniature electronic tuner, two or more channels for selectively receiving and transmitting one of a plurality of possible input signals transmitted by the master transmission system, a multiplexer for isolating and improving the signal characteristics of the input and/or output signal(s), and/or a remote control by means of which an operator can turn the speaker system on and off, change channels, fine tune input signal reception, etc.

By means of the invention, individuals engaged in activities in which music or announcements are fed through localized speaker arrangements can distribute the signals in a simple and cost effective manner, using radio frequencies to distribute the signals rather than a conventional hard-wired speaker system of greater cost and complexity.

According to a first set of examples of the invention, there is provided a light socket mounted speaker system comprising: means for attaching to a light socket, whereby electrical energy is provided to the system; means for converting a radio signal into an audio signal; means for propagating the audio signal; means for receiving a light bulb; means for distributing electrical energy to the receiving means; and means for selectively actuating the propagation means and the electrical distribution means.

In another example, the selective actuation means of the above-described light socket mounted speaker system includes a detector connected to the attachment means, the detector actuating the propagation means upon detecting an electrical signal from the attachment means.

In another example, the above-described light socket mounted speaker system further includes a remote control and the selective actuation means comprises a detector connected to the attachment means, the detector actuating the propagation means upon detecting a signal from the remote control.

In another example, the selective actuation means of the above-described light socket mounted speaker system includes a detector connected to the attachment means. The detector, upon detecting a signal, selectively toggles between: actuating the electrical energy distribution means, actuating the propagation means, and de-actuating the electrical energy distribution means.

In another example, the conversion means of the above-described light socket mounted speaker system includes a single frequency radio receiver.

In another example, the detector of the above-described light socket mounted speaker system further includes a channel selection output. The radio receiver further includes a selectable tuner controlled by the channel selection output of the detector, whereby the radio signal may be selected from a plurality of radio frequency channels.

According to a second set of examples of the invention, there is provided a speaker system for disposing in a light bulb receiving member comprising: a speaker disposed in a screw terminal of the light bulb receiving member; the speaker comprising a radio frequency tuner; and the tuner in electrical connection with said speaker.

In another example, the above-described speaker system includes: a radio receiving member, the receiving member appropriate for receiving a radio frequency type input signal from a master transmission system; and a local transmitter for transmitting a localized output signal in the vicinity of the speaker. In a further example, the tuner includes: an electronic radio frequency tuner having two or more channels for selectively receiving and transmitting one of a plurality of possible input signals transmitted by the master transmission system; a multiplexer for isolating and improving the signal characteristics of the signals; and means for controlling the receiving and transmitting functions of the system. In a further example, the controlling means includes means to turn the speaker system on and off. In a further example, the controlling means includes means to select an input signal from a plurality of possible input signals. In a further example, the controlling means includes means to adjust tuning reception of the selected input signal.

In another example, the radio frequency tuner of the above-described speaker system is a single crystal type tuner.

In another example, the radio frequency tuner of the above-described speaker system is a selective electronic tuner providing a selection from a plurality of radio frequency input signals.

According to a third set of examples of the invention, there is provided a light socket mounted radio receiver speaker device comprising: a light bulb screw base for attaching to a light socket, whereby electrical energy is provided to the device; a detector, in communication with the electrical energy, having a detector signal input, a first electrical output and a control output; a radio receiver controlled by the control output of the detector, having a radio frequency input and an audio signal output, whereby the radio receiver converts a radio signal into an audio signal; a speaker connected to the audio signal output of the radio receiver, whereby the audio signal may be propagated; and a light bulb socket in electrical connection with the first electrical output of the detector.

In another example, the radio receiver of the above-described light socket mounted radio receiver speaker includes a single-frequency radio tuner.

In another example, the detector of the above-described light socket mounted radio receiver speaker further includes a channel selection output and the radio receiver further includes a selectable tuner controlled by the channel selection output of the detector, whereby the radio signal may be selected from a plurality of radio frequency channels.

In another example, the detector signal input of the above-described light socket mounted radio receiver speaker further includes a remote-control signal detector.

In another example, the detector of the above-described light socket mounted radio receiver speaker selectively switches between: actuating the electrical energy to the light bulb socket, actuating the radio receiver, and de-actuating the electrical energy to the light bulb socket.

BRIEF DESCRIPTION OF THE SEVERAL DRAWINGS

DETAILED DESCRIPTION

Each of FIGS. 1-4 illustrates a speaker system embodying various aspects of the present invention, though these particular embodiments are illustrated and described herein only for exemplary purposes. Moreover, variations of the speaker system and methods of utilizing the same will become apparent to those of ordinary skill in the relevant structural and mechanical arts upon reading the following disclosure. Thus, the present invention is not to be considered limited to only the structures, systems, and methods described herein.

Figure 1:
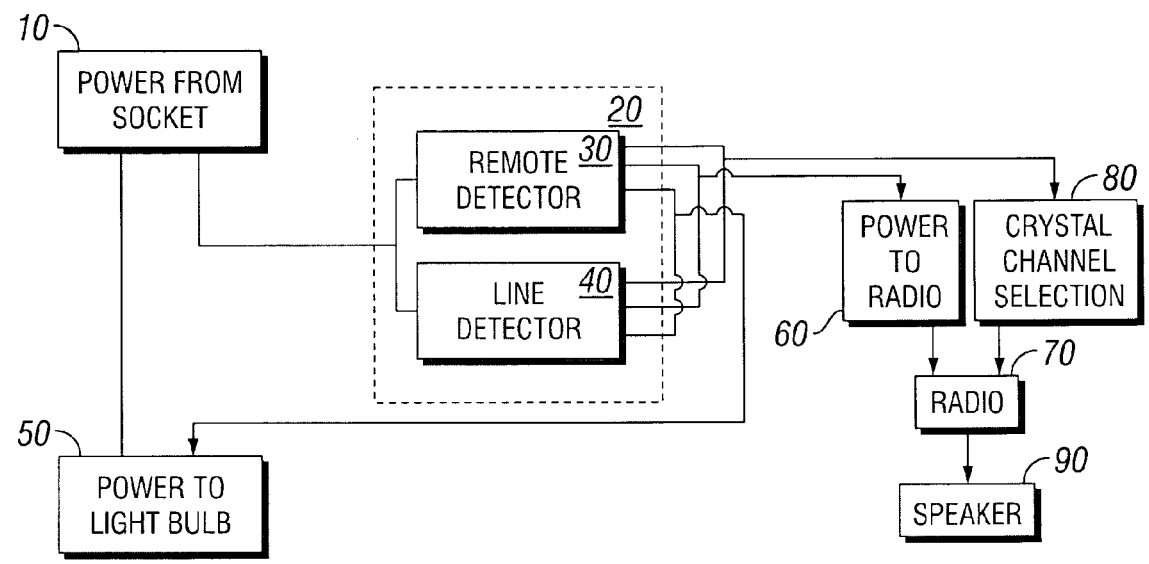
FIG. 1 is a schematic view of an example configuration of the speaker system of the prevent invention.

As illustrated in FIG. 1, there is provided a schematic view of an example configuration of the speaker system of the prevent invention. The present invention is placed in between power provided from a light bulb receiving means, such as a socket or receptacle, and the electrical contacts of a light bulb. Power from the socket 10 is routed, by a detector 20, providing means for distributing electrical energy to the light bulb receiving means, such as a light bulb socket or receptacle. In one example, detector 20 comprises both a remote detector 30 and a line detector 40.

Figure 4:
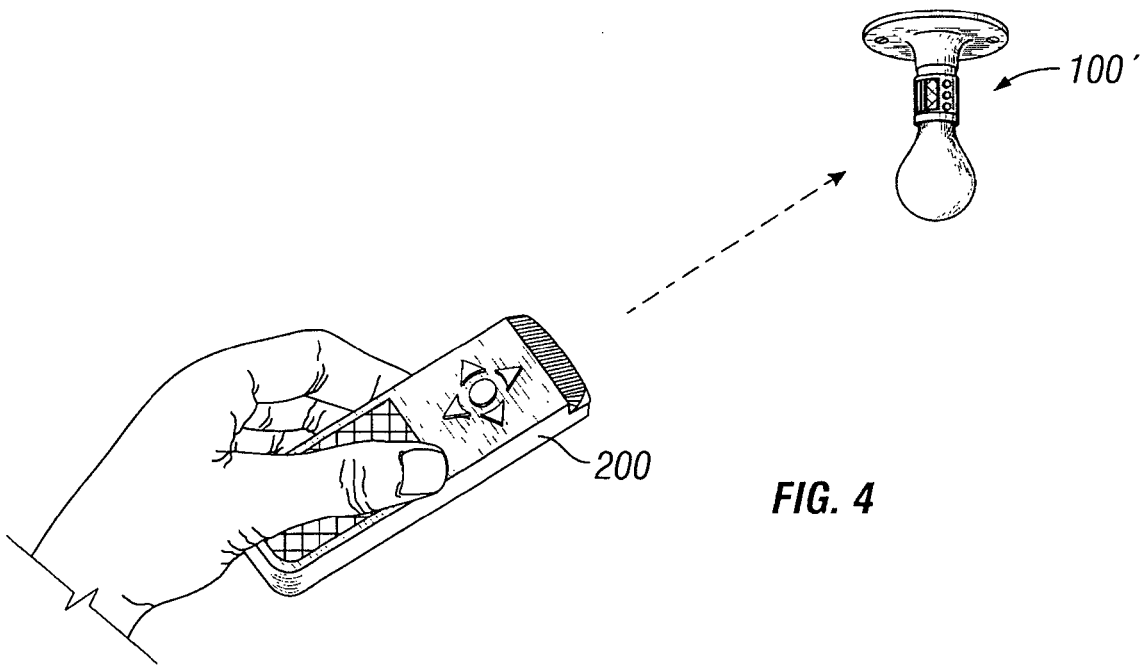
FIG. 4 is a 3-D perspective view of an example of the speaker device of the prevent invention shown installed in a light socket with remote control activation.

Remote detector 30 receives signals from a remote control device (illustrated in FIG. 4). Remote detector 30 shows one example of means for selectively actuating the speaker device and the light bulb socket. Based on signals received by remote detector 30, power is routed to either power a light bulb socket 50 or to power radio module 60, or both. Light bulb socket 50 is one example of means for receiving a light bulb, as many other connectors and plugs in the art achieve an equivalent functional purpose. Power to radio module 60 activates radio 70.

Line detector 40 detects changes in power from socket 10. Line detector 40 shows another example of means for selectively actuating the speaker device and the light bulb socket. Based on changes in power from socket 10, line detector 40 routes electricity to either power a light bulb socket 50 or to power a radio 60, or both. In another example of the present invention, multiple radio frequencies may be selected. Based on signals received by remote detector 30, a channel selection signal is sent to select a radio channel 80, which in turn, sets radio 70 to the desired channel. In still another example, signals received by line detector 40, a channel selection signal is sent to select a radio channel 80, which in turn, sets radio 70 to the desired channel.

Means are provided for converting a radio signal into an audio signal. For example, radio 70 converts the radio channel to an audio signal. Means are provided for propagating the audio signal. For example, radio 70 then sends the audio signal to a speaker 90.

Figure 2A:
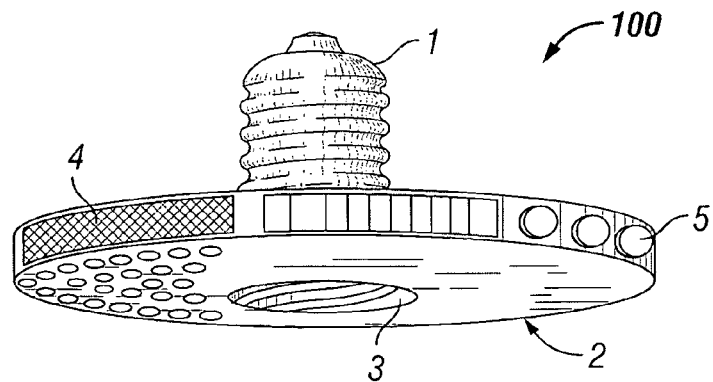
FIG. 2A is a 3-D perspective view of an example flat structure speaker device of the prevent invention.

As illustrated in FIG. 2A, there is provided a 3-D perspective view of an example flat structure speaker device 100 of the prevent invention. Screw base 1 shows one example of means for attaching to a light socket, giving structural support and allowing connection to the electrical mains, providing electrical energy to the device. Attached to screw base 1 is a housing 2 for holding means to selectively actuate either the radio or an attached light bulb, or both. A light bulb socket 3 is attached to housing 2, preferably in line with screw base 1. Housing 2 incorporates a speaker 4 and radio (not illustrated). In one example, housing 2 incorporates sensors 5 for receiving signals from a remote control (illustrated in FIG. 4).

Figure 2B:
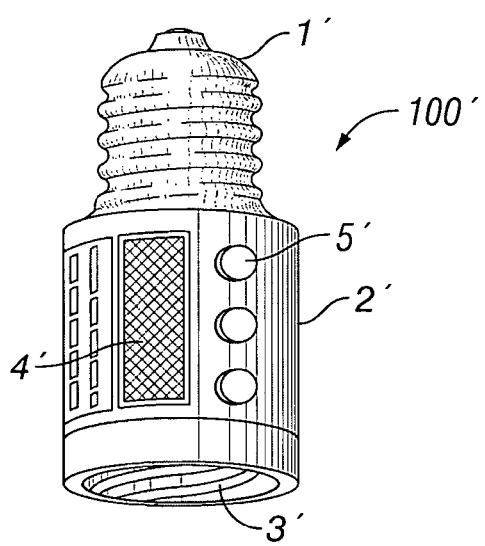
FIG. 2B is a 3-D perspective view of an example long structure speaker device of the prevent invention.

As illustrated in FIG. 2B, there is provided a 3-D perspective view of an example long structure speaker device 100' of the prevent invention. Screw base 1' shows one example of means for attaching to a light socket, giving structural support and allowing connection to the electrical mains, providing electrical energy to the device. Attached to screw base 1' is a housing 2' for holding means to selectively actuate either the radio or an attached light bulb, or both. A light bulb socket 3' is attached to housing 2', preferably in line with screw base 1'. Housing 2' incorporates a speaker 4' and radio (not illustrated). In one example, housing 2' incorporates sensors 5' for receiving signals from a remote control (illustrated in FIG. 4).

Figure 3:
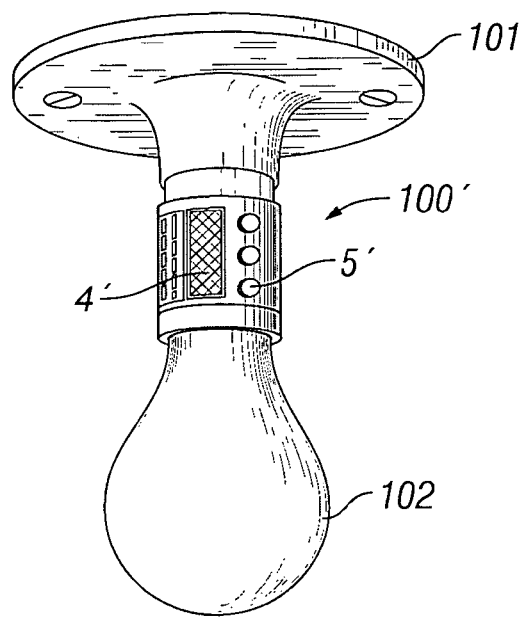
FIG. 3 is a 3-D perspective view of an example of the speaker device of the prevent invention shown installed in a light socket.

As illustrated in FIG. 3, there is provided a 3-D perspective view of an example of the speaker device of the prevent invention shown installed in a light socket. Light bulb fixture 101 contains a light bulb screw base, which may be called a light bulb receiving member (not illustrated). In this example, speaker device 100' is screwed into the screw base of fixture 101. A light bulb 102 is screwed into the light bulb socket 3' of speaker device 100'. Speaker 4' and sensors 5' are exposed on the outer surface of housing 2'.

As illustrated in FIG. 4, there is provided a 3-D perspective view of an example of the speaker device of the prevent invention shown installed in a light socket with remote control activation. A hand held remote control 200 is used to send signals to speaker device 100'. Based on the signals sent, the light may be turned on or off and the radio may be turned on or off. In one example of the present invention, signals may be sent to change radio channel selection.

In one example of the present invention, the detector senses an electrical signal on the line, such as the turning on of the light switch that is connected to the light fixture. Based on that electrical signal, the speaker is turned on. This may be accomplished by applying power to the radio. In a further example, this may also be accomplished by closing connection between the radio and the speaker. In either method, the detector actuates the speaker.

In another example of the present invention, the detector senses a remote control signal, such as an infrared signal from a hand held remote control. Based on that remote control signal, the speaker is turned on. This may be accomplished by applying power to the radio. In a further example, this may also be accomplished by closing connection between the radio and the speaker. In either method, the speaker is actuated.

In another example of the present invention, a signal received by the detector is used to toggle between various modes of operation of the speaker device. For example, the first time a signal is detected, power is sent to the light bulb socket, lighting the light bulb as would ordinarily be expected when turning on a light switch. The second time a signal is detected, the speaker is actuated so the radio signal may be heard. The third time a signal is detected, the light is turned off but the radio remains on. In a further example, the signal may be caused by toggling a light switch on and off within a short period of time. In this example, a user would turn on a light switch and experience the light bulb coming on as would ordinarily be expected when turning on a light switch. If the user wants to also listen to the radio of the present invention, the user toggles the light switch on and off and on, thereby turning on the light bulb and also the radio. If the user wants to also listen to the radio of the present invention with the light bulb not lit, the user toggles the light switch on and off and on and off and on, thereby turning on just the radio. If the user wants to turn off both the radio and the light bulb, the user toggles the light switch to the off position. No power is going to the light bulb socket, so the radio and light bulb cease operation.

In an example of the present invention, a single frequency radio receiver is used. In a further example, the detector sends a channel selection output to a selectable tuner to select from two or more fixed channels. The radio receiver converts the selected channel to an audio signal.

In another example, the speaker system is able to receive a radio signal from a master transmission system and retransmit a local signal in the area of the speaker. The retransmitted signal may be selected from two or more channels. A multiplexer may be incorporated into the tuner to improve the signal quality. A remote control may be used to select the signals. The remote control may also be used to turn the speaker on or off. In a further example, the remote control may be used to fine tune the reception of the input signal.

The foregoing description is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant structural or mechanical art. Further, the embodiments described are also intended to explain the best mode for practicing the invention, and to enable others skilled in the art to utilize the invention and such or other embodiments and with various modifications required by the particular applications or uses of the invention. It is intended that the appended claims be construed to include alternative embodiments to the extent that is permitted by prior art.

What is claimed is:

1. A light socket mounted speaker system comprising:
    means for attaching to a light socket, whereby electrical energy is provided to the system;
    means for converting a radio signal into an audio signal;
    means for propagating said audio signal;
    means for receiving a light bulb;
    means for distributing electrical energy to said receiving means; and
    means for selectively actuating said propagation means and said electrical distribution means,
    wherein said selective actuation means comprises a detector connected to said attachment means, said detector actuating said propagation means upon detecting an electrical signal from said attachment means.

2. The light socket mounted speaker system of claim 1 further comprising:
    a remote control; and
    wherein said selective actuation means comprises a detector connected to said attachment means, said detector actuating said propagation means upon detecting a signal from said remote control.

3. The light socket mounted speaker system of claim 1 wherein said selective actuation means comprises a detector connected to said attachment means, said detector, upon detecting a signal, selectively toggling between: actuating said electrical energy distribution means, actuating said propagation means, and de-actuating said electrical energy distribution means.

4. The light socket mounted speaker system of claim 1 wherein said conversion means comprises a single frequency radio receiver.

5. The light socket mounted speaker system of claim 1 wherein said detector further comprises a channel selection output and said radio receiver further comprises a selectable tuner controlled by said channel selection output of said detector, whereby said radio signal may be selected from a plurality of radio frequency channels.

6. A speaker system for disposing in a light bulb receiving member comprising:
    a speaker disposed in a screw terminal of the light bulb receiving member;
    said speaker comprising a radio frequency tuner, wherein said tuner is disposed in electrical communication with said speaker;
    a radio receiving member, said receiving member appropriate for receiving a radio frequency type input signal from a master transmission system; and
    a local transmitter for transmitting a localized output signal in the vicinity of said speaker.

7. The speaker system of claim 6 wherein said tuner comprises:
    an electronic radio frequency tuner having two or more channels for selectively receiving and transmitting one of a plurality of possible input signals transmitted by the master transmission system;
    a multiplexer for isolating and improving the signal characteristics of the signals; and
    means for controlling the receiving and transmitting functions of the system.

8. The speaker system of claim 7 wherein said controlling means comprises means to turn said speaker system on and off.

9. The speaker system of claim 7 wherein said controlling means comprises means to select an input signal from a plurality of possible input signals.

10. The speaker system of claim 7 wherein said controlling means comprises means to adjust tuning reception of said selected input signal.

11. The speaker system of claim 6 wherein said radio frequency tuner is a single crystal type tuner.

12. The speaker system of claim 6 wherein said radio frequency tuner is a selective electronic tuner providing a selection from a plurality of radio frequency input signals.

13. A light socket mounted radio receiver speaker device comprising:
- a light bulb screw base for attaching to a light socket, whereby electrical energy is provided to the device;
- a detector, in communication with said electrical energy, having a detector signal input, a first electrical output and a control output;
- a radio receiver controlled by said control output of said detector, having a radio frequency input and an audio signal output, whereby said radio receiver converts a radio signal into an audio signal, and wherein said radio receiver further comprises a single-frequency radio tuner;
- a speaker connected to said audio signal output of said radio receiver, whereby said audio signal may be propagated; and
- a light bulb socket in electrical connection with said first electrical output of said detector.

14. The light socket mounted radio receiver speaker of claim 13 wherein said detector further comprises a channel selection output and said radio receiver further comprises a selectable tuner controlled by said channel selection output of said detector, whereby said radio signal may be selected from a plurality of radio frequency channels.

15. The light socket mounted radio receiver speaker of claim 13 wherein said detector signal input of said detector further comprises a remote-control signal detector.

16. The light socket mounted radio receiver speaker of claim 13 wherein said detector selectively switches between: actuating the electrical energy to said light bulb socket, actuating said radio receiver, and de-actuating said electrical energy to said light bulb socket.

* * * * *